US011819918B2

United States Patent
Sonderegger et al.

(10) Patent No.: US 11,819,918 B2
(45) Date of Patent: Nov. 21, 2023

(54) METHOD FOR PRODUCING A MACHINING SEGMENT FOR AN ABRASIVE MACHINING TOOL

(71) Applicant: Hilti Aktiengesellschaft, Schaan (LI)

(72) Inventors: Marcel Sonderegger, Balgach (CH); Matthias Mueller, Buchs (CH); Heiko Schaefer, St. Gallen (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/635,682

(22) PCT Filed: Jul. 24, 2018

(86) PCT No.: PCT/EP2018/069979
§ 371 (c)(1),
(2) Date: Jan. 31, 2020

(87) PCT Pub. No.: WO2019/025229
PCT Pub. Date: Feb. 7, 2019

(65) Prior Publication Data
US 2021/0121961 A1    Apr. 29, 2021

(30) Foreign Application Priority Data

Aug. 1, 2017  (EP) ..................................... 17184200

(51) Int. Cl.
*B22F 3/16*     (2006.01)
*B22F 5/00*     (2006.01)
(Continued)

(52) U.S. Cl.
CPC .................. *B22F 7/06* (2013.01); *B22F 3/16* (2013.01); *B22F 5/00* (2013.01); *B22F 7/02* (2013.01);
(Continued)

(58) Field of Classification Search
CPC ........ B22F 2005/001; B22F 7/02; B22F 3/16; B23P 15/28
See application file for complete search history.

(56) References Cited

U.S. PATENT DOCUMENTS

| 5,203,880 A * | 4/1993 | Tselesin ................... B24D 3/14 51/293 |
| 2002/0077054 A1 | 6/2002 | Sung et al. |

(Continued)

FOREIGN PATENT DOCUMENTS

| EP | 0 925 378 B1 | 4/2002 |
| EP | 1231288 A1 | 8/2002 |

(Continued)

OTHER PUBLICATIONS

JP-08170482-A English translation (Year: 1996).*

(Continued)

*Primary Examiner* — Sally A Merkling
*Assistant Examiner* — Sean P. O'Keefe
(74) *Attorney, Agent, or Firm* — Davidson, Davidson & Kappel, LLC

(57) ABSTRACT

A method of producing a machining segment, in which a green body (51) is constructed from a machining zone (54), wherein the machining zone (54) is produced from a first metallic powder material (56) and hard material particles (58), the green body (51) is compacted under pressure with a compression pressure to result in a compact body and the compact body is sintered thermally at a sintering temperature to result in the finished machining segment, wherein the machining zone (54) is produced by layer-by-layer application of material layers of the first metallic powder material (56) and particle layers of the hard material particles (58), wherein the hard material particles (58) in one particle layer (Continued)

are placed into the previously applied material layer of the first metallic powder material (56).

22 Claims, 6 Drawing Sheets

(51) Int. Cl.
    *B22F 7/02*    (2006.01)
    *B22F 7/06*    (2006.01)
    *B22F 10/10*    (2021.01)
    *B23P 15/28*    (2006.01)

(52) U.S. Cl.
    CPC ..... *B22F 2005/001* (2013.01); *B22F 2304/10* (2013.01); *B23P 15/28* (2013.01)

(56) References Cited

U.S. PATENT DOCUMENTS

| | | | |
|---|---|---|---|
| 2003/0089364 A1* | 5/2003 | Kim | B28D 1/041 125/39 |
| 2005/0210755 A1 | 6/2005 | Cho et al. | |
| 2010/0043304 A1 | 2/2010 | Lee et al. | |
| 2011/0168926 A1* | 7/2011 | Hobbs | G21F 9/36 250/518.1 |
| 2012/0285293 A1* | 11/2012 | Mirchandani | C22C 29/00 75/230 |
| 2015/0328694 A1 | 11/2015 | Hoop et al. | |
| 2015/0343540 A1 | 12/2015 | Hoop et al. | |
| 2017/0368714 A1 | 12/2017 | Mueller et al. | |

FOREIGN PATENT DOCUMENTS

| | | |
|---|---|---|
| EP | 2745965 A1 | 6/2014 |
| EP | 2745966 A1 | 6/2014 |
| EP | 3037230 A1 | 6/2016 |
| JP | 08170482 A * | 7/1996 |
| WO | WO 2017114675 A1 | 7/2017 |

OTHER PUBLICATIONS

T123™ Nickel Powder (CDN), Vale Canada Limited 2010(2011) (Year: 2011).*
Powder Metallurgy Grades Data Sheet Hoeganaes Corporation (1987) (Year: 1987).*
EP3037230A1 English translation (Year: 2016).*
International Search Report of PCT/EP2018/069979, dated Sep. 27, 2018.
Kroeger Jens et al: "Flow rate ranges for spherical metallic powders for additive manufacturing", Progress in Additive Manufacturing, Bd. 7, Nr. 2, 25. Apr. 2022 (Apr. 25, 2022), pp. 411-418, XP093079791 ISSN: 2363-69512. DOI: 10.1007/s40964-021-00238-7.

* cited by examiner

METHOD FOR PRODUCING A MACHINING SEGMENT FOR AN ABRASIVE MACHINING TOOL

The present invention relates to a method of producing a machining segment for an abrasive machining tool.

BACKGROUND

Abrasive machining tools such as drill bits, saw blades and grinding disks include machining segments that are secured on a tubular or disk-shaped main body, with bonding of the machining segments to the main body, for example, by welding, soldering or adhesion. Depending on the machining method of the abrasive machining tool, the machining segments are referred to as drill segments, saw segments or grinder segments and are summarized by the term "machining segments".

Machining segments have a machining zone constructed from a metallic powder material and hard material particles. The machining of a substrate is effected by means of the hard material particles distributed in the metallic powder material. Machining segments that are to be welded to the tubular or disk-shaped main body of the abrasive machining tool are constructed from the machining zone and a neutral zone, where the neutral zone is constructed from a metallic powder material different than the metallic powder material of the machining zone; the neutral zone is also generally free of hard material particles. The neutral zone is required since the metallic powder materials that are typically used for the construction of the machining zone can generally be welded only with difficulty.

EP 0 925 378 B1 describes a known method of producing machining segments for abrasive machining tools. The machining segments are constructed from a metallic pulverulent material and hard material particles, wherein the metallic powder material and the hard material particles are mixed and the hard material particles are arranged in random distribution in the metallic powder material. The mixture of metallic powder material and randomly distributed hard material particles is introduced into a mold and compacted under pressure to a compact body, with compaction of the compact body as far as the final geometry of the machining segment. The compact body is then sintered by unpressurized sintering to result in the final machining segment. The compact body is also referred to as compacted green body, which means that the compact body has not yet been sintered. The compact body is produced by cold compression at compression pressures between 320 and 1500 MPa, especially at compression pressures between 400 and 850 MPa, and sintered in the subsequent sintering process by unpressurized sintering at temperatures between 900 and 1300° C., especially at temperatures between 900° C. and 1050° C. The machining segments produced according to EP 0 925 378 B1 have a porosity between 10% and 25% by volume, where a porosity of 10% by volume corresponds to an average density of 90% of the theoretical density and a porosity of 25% by volume to an average density of 75% of the theoretical density.

Drilling and sawing experiments with machining segments that have been produced by means of the method described in EP 0 925 378 B1 have shown that the lifetime of the machining segments is reduced compared to machining segments having a porosity below 10% by volume. The pores distributed in the machining segment do not offer sufficient holding forces for the hard material particles in the sintered metallic powder material, and so the hard material particles are loosened during machining, the result of which is that the hard material particles fall out prematurely and the lifetime of the machining segments is reduced.

The lifetime of the machining segments can be increased by a reduction in the porosity. The method of producing machining segments which is known from EP 0 925 378 B1 is incapable of producing machining segments having a porosity below 10% by volume in an economically viable manner. The known method has the disadvantage that the hard material particles are arranged in random distribution in the metallic powder material and can protrude from the surface of the compacted green body. Hard material particles that protrude from the surface of the compacted green body can damage the mold on compaction of the green body to the final geometry. At compression pressures exceeding 850 MPa, the molds have elevated wear, which increases the mold costs in production and can make the production of the machining segments uneconomic. In order to reduce wear on the molds, it is necessary to reduce the compression pressures, but the machining segments have lower average densities and hence higher porosity as a result of a reduction in the compression pressure below 850 MPa.

SUMMARY OF THE INVENTION

It is an object of the present invention to develop a method of producing a machining segment in which the porosity of the finished machining segment is below 10% by volume, with production of the machining segments at minimum expense and with maximum conservation of molds.

According to the invention, the method of producing a machining segment is characterized in that the machining zone is produced by layer-by-layer application of material layers of the first metallic powder material and particle layers of the hard material particles, where the hard material particles in one particle layer are placed into the previously applied material layer of the first metallic powder material. The placing of the hard material particles into the material layers of the first metallic powder material allows the hard material particles to be arranged exclusively within the green body, such that no hard material particles come into contact with the mold on compaction of the green body to the final geometry of the machining segment. The method according to the invention has the advantage that no wear on the molds occurs as a result of protruding hard material particles on compaction of the green bodies under pressure. Since the hard material particles are arranged exclusively within the green body, high compression pressures can be used in the compaction, which compact the green bodies to the final geometry. High compression pressures enable the production of machining segments having an average density exceeding 90% of the theoretical density and a porosity below 10% by volume.

In the method of the invention, the machining segments are produced in three stages: in the first stage green bodies are constructed layer by layer, in the second stage the green bodies are compacted under pressure essentially to the final geometry of the machining segments (compact bodies), and in the third stage the compact bodies are sintered thermally to result in finished machining segments. The green bodies constructed layer by layer are compacted under pressure at a compression pressure until the compact bodies have essentially the final geometry of the finished machining segments. Suitable methods that achieve compression of the green bodies are, for example, cold compression methods or hot compression methods. In cold compression methods the green bodies are subjected exclusively to compression, whereas the green bodies in hot compression methods are subjected not only to compression but also to temperatures of up to 200° C. The compact bodies are sintered thermally at a sintering temperature to result in finished machining segments. On sintering, the strength of the machining segments is increased by diffusion processes in the surface region of the powder particles and through formation of what are called sinter necks, and any processing auxiliary used is burnt out. The sintering is effected in an unpressurized and form-free manner, "unpressurized" meaning that the sintering process is effected without pressure and "form-free" that the sintering process is effected without a mold.

The method of the invention for producing a machining segment is suitable for metallic powder materials and hard substance materials. The term "metallic powder materials" includes all metallic materials that are solid in the starting state and consist of loose, i.e. unbonded, powder grains. Metallic powder materials may consist of one material powder or be composed of a mixture of different material powders. Metallic powder materials for the production of the machining segments within the method of the invention typically consist of a base powder, which is combined with compression auxiliaries and additives, where the additives serve to optimize the properties of the first metallic powder material with regard to the strength and wear rate of the machining segments. The base powder may consist of one base material or be composed of multiple base materials. The term "hard material particles" encompasses all cutting media for machining segments. In particular, these include individual hard material particles, composites composed of multiple hard material particles, and coated or encapsulated hard material particles. Hard materials are notable for exceptional hardness. Hard materials can be divided firstly into natural and synthetic hard materials, and secondly into metallic and non-metallic hard materials. The natural hard materials include natural diamonds, corundum and other hard minerals, and the synthetic hard materials include synthetic diamonds and high-melting carbides, borides, nitrides and silicides. The metallic hard materials include the high-melting carbides, borides, nitrides and silicides of the transition metals from the fourth to sixth groups of the Periodic Table, and the non-metallic hard materials include diamond, corundum, other hard minerals, silicon carbide and boron carbide.

The machining zone is preferably produced from N material layers of the first metallic powder material and M particle layers of the hard material particles, where the number N of material layers is not less than the number M of particle layers. The hard material particles are arranged in M particle layers, where each particle layer has a defined set pattern for the hard material particles. The set pattern of the particle layers and the number of hard material particles in the particle layers are typically matched to the field of application of the machining segments. The number N and thickness of the material layers of the first metallic powder material are used to adjust the distance between the particle layers of the hard material particles. In the case of machining of different substrates, it may be helpful to adjust the distance between the particle layers of the hard material particles to the substrate to be machined.

More preferably, the hard material particles in a particle layer are placed into the previously applied material layer of the first metallic powder material with a lateral distance of greater than 50 μm. The placing of the hard material particles of a particle layer with a lateral distance into the material layers of the first metallic powder material ensures that the hard material particles are arranged exclusively within the green body, such that no hard material particles come into contact with the mold on compaction of the green body to the final geometry of the machining segment. Since the hard material particles are disposed exclusively within the green body, high compression pressures can be used in the compaction, which compact the green body to the final geometry with an average density exceeding 90% of the theoretical density and a porosity below 10% by volume. The machining segments are also produced in a mold-conserving manner at compression pressures exceeding 850 MPa.

More preferably, the placing of the Mth particle layer of the hard material particles is followed by application of a further material layer of the first metallic powder material as upper outer layer. The application of a further material layer of the first metallic powder material as outer layer ensures that there is no protrusion of hard material particles on the top face of the green body that could damage the mold on compaction of the green body under pressure. The machining segments are also produced in a mold-conserving manner at compression pressures exceeding 850 MPa.

In a preferred embodiment, the green body is compacted under pressure with a compression pressure between 850 MPa and 1250 MPa to result in the compact body. The properties of the first metallic powder material are chosen such that the green body is compressible at a pressure between 850 MPa and 1250 MPa to an average density $\delta$ of at least 90% of the theoretical density $\delta_{th}$ of the first metallic powder material. At an average density $\delta$ of at least 90% of the theoretical density $\delta_{th}$, the porosity of the machining segment is below 10% by volume.

In a preferred embodiment, the compact body is sintered thermally at a sintering temperature between 900° C. and 1050° C. to result in the finished machining segment. The properties of the first metallic powder material are chosen such that the compact body can be sintered at a sintering temperature between 900° C. and 1050° C. The first metallic powder material is composed of a base powder, a compression auxiliary and additives, where the additives serve to optimize the properties of the first metallic powder material with regard to the strength and wear rate of the machining segments. What is used here is especially a metal sulfide that can adjust the wear rate. The sintering temperature is chosen such that the metal sulfide used is in the liquid phase at the sintering temperature chosen, i.e. the sintering temperature is above the melting temperature of the metal sulfide used.

Machining segments that are produced by means of the method of the invention have been constructed from the first metallic powder material and hard material particles. The machining is effected by means of the hard material particles, the distribution of which in the machining segment is matched to the substrate to be machined. In order to assure the distribution of the hard material particles, the hard material particles must be placed in the material layers with sufficient precision, the positions of the placed hard material particles must be maintained during the production of the machining segments, and the hard material particles must on the one hand be fixed in the sintered first metallic powder material during the treatment with the machining segments and on the other hand must be released for the machining of the substrate. These requirements that result from the use of hard material particles as cutting media can be used to derive values for the strength of the finished machining segment and the wear rate of the sintered first metallic powder material.

Preferably, the first metallic powder material used is a metallic powder material which is at least readily flowing. More preferably, the first metallic powder material used is a metallic powder material which is free-flowing. An at least readily flowing first metallic powder material is suitable for the layer-by-layer construction of the green body within the method of the invention. The higher the flowability of the first metallic powder material, the better the suitability of the first metallic powder material for the layer-by-layer construction of the green body from multiple material layers and powder layers within the method of the invention for production of a machining segment.

The flowability of metallic powder materials is determined to standard ISO 4490 with the aid of a calibrated test funnel which is referred to as a Hall flowmeter. A metallic powder material is referred to as readily flowing when an amount of the metallic powder material of 50 g passes through a Hall flowmeter with an exit opening of 5.0 mm without an external stimulus. A metallic powder material is referred to as free-flowing when an amount of the metallic powder material of 50 g passes through a Hall flowmeter with an exit opening of 2.5 mm without an external stimulus.

The first metallic powder material used is preferably a metallic powder material a maximum grain size of 200 μm on. Metallic powder materials having a maximum grain size of 200 μm enable exact placing of the hard material particles in the first metallic powder material of the material layer applied beforehand. Since the deviations with which the hard material particles can be placed in the material layers are in the order of magnitude of the grain size, it is possible with the first metallic powder material used to achieve the required accuracy in the placing of the hard material particles.

Preferably, the first metallic powder material used is a metallic powder material compressible at a maximum pressure of 1250 MPa to an average density δ of greater than 90% of the theoretical density $\delta_{th}$. The theoretical density $\delta_{th}$ of the first metallic powder material is calculated from the specific weights ρi and the proportions by weight wi of the n components (base powder and additives) according to the formula $\delta_{th}=100/\Sigma_{i=1}^{n}(wi/\rho i)$. The porosity φ of the machining segments can be calculated from the average density δ and the theoretical density $\delta_{th}$ by the formula $\phi=1-\delta/\delta_{th}$. At average densities δ of greater than 90% of the theoretical density $\delta_{th}$, the porosity φ of the machining segments is below 10% by volume.

More preferably, the first metallic powder material used is a metallic powder material compressible at a maximum pressure of 1250 MPa to an average density δ of greater than 93% of the theoretical density $\delta_{th}$. At average densities δ of greater than 93% of the theoretical density $\delta_{th}$, the porosity φ of the machining segments is below 7% by volume. The smaller the porosity of the machining segments, the better the hard material particles are held in the sintered first metallic powder material.

In a preferred embodiment, the first metallic powder material used is a metallic powder material which is free-flowing, has a maximum grain size of 200 μm and is compressible at a maximum pressure of 1250 MPa to an average density δ of greater than 90% of the theoretical density $\delta_{th}$. A first metallic powder material having the properties mentioned (flowability, maximum grain size and compatibility) enables the production of machining segments that meet the demands with regard to the strength of the finished machining segment and the wear rate of the sintered first metallic powder material. The layer-by-layer construction of the green body from material layers requires an at least readily flowing first metallic powder material. The use of powder grains having a maximum grain size of 200 μm ensures that the hard material particles can be placed with sufficient accuracy into the material layer applied beforehand. A first metallic powder material compressible at a maximum pressure of 1250 MPa to an average density δ of at least 90% of the theoretical density $\delta_{th}$ is suitable the production of machining segments having a porosity of less than 10% by volume.

The first metallic powder material used in the method of the invention differs in the properties mentioned from metallic powder materials that are used in the hot pressing of green bodies with hard material particles in random distribution and in the hot pressing of green bodies constructed layer by layer. For green bodies constructed layer by layer, an at least readily flowing metallic powder material is required. In order to increase the flowability of metallic powder materials, metallic powder materials are pre-treated by dry or wet granulating. Metallic powder materials pre-treated by dry or wet granulating generally have the disadvantage that these metallic powder materials can be compressed only at compression pressures greater than 1250 MPa to an average density δ of at least 90% of the theoretical density $\delta_{th}$.

In a preferred embodiment, the first metallic powder material used is a metallic powder material containing at least 80% by mass of elemental or low-alloy iron powder. A powder is referred to as low-alloy powder when the alloy constituents are below 5% by mass. The method of the invention enables the production of machining segments from inexpensive metallic powder materials that do not require complex pre-treatment, for example by dry or wet granulating, and nevertheless fulfil the demands mentioned for the production of machining segments. A suitable base powder for the first metallic powder material is, for example, the pre-alloyed iron powder Astaloy Mo from Höganäs that has been pre-alloyed with 1.5% molybdenum. The iron powder Astaloy Mo is free-flowing, has a maximum grain size of 200 μm and is compressible by a maximum pressure of 1250 MPa to an average density δ of at least 93% of the theoretical density $\delta_{th}$.

More preferably, the first metallic powder material used is a metallic powder material containing not more than 10% by mass of a metal sulfide. The strength and wear rate of the machining segments can be adjusted by the addition of a metal sulfide. Metal sulfides, such as molybdenum sulfide, bismuth sulfide etc., ensure loosening of the first metallic powder material and adjust the wear rate of the machining segments.

Particular preference is given to using a metal sulfide having a melting temperature below the sintering temperature. The sintering temperature at which the compact is sintered in the method of the invention to give the finished machining segment is especially between 900° C. and 1050° C. Since the melting temperature of the metal sulfide is below the sintering temperature, the metal sulfide is in the liquid phase in the course of sintering. The liquid phase of the metal sulfide means that the metal sulfide can be distributed more homogeneously in the machining zone of the machining segment.

In a preferred further development of the method, the green body is constructed from the machining zone and a neutral zone, where the neutral zone is produced from a second metallic powder material and the second metallic powder material is different than the first metallic powder material. Machining segments that are to be welded to the tubular or disk-shaped main body of the abrasive machining tool consist of a machining zone and a neutral zone, where the machining zone has been constructed from a first metallic powder material and the neutral zone from a second metallic powder material. The first metallic powder material is selected with regard to the machining properties of the machining segments, and the second metallic powder material is selected with regard to weldability.

Preferably, the second metallic powder material used is a metallic powder material which is at least readily flowing. More preferably, the second metallic powder material used is a metallic powder material which is free-flowing. An at least readily flowing second metallic powder material is suitable for the layer-by-layer construction of the neutral zone within the method of the invention. The higher the flowability of the second metallic powder material, the better the suitability of the second metallic powder material for the layer-by-layer construction of the neutral zone within the method of the invention for production of a machining segment.

Preferably, the second metallic powder material used is a metallic powder material compressible at a maximum pressure of 1250 MPa to an average density δ of greater than 90% of the theoretical density $δ_{th}$. At average densities δ of greater than 90% of the theoretical density $δ_{th}$, the porosity ϕ of the neutral zone of the machining segments is below 10% by volume. The lower the porosity of the neutral zone of the machining segments, the higher the breakout resistance of the machining segments and hence the robustness of the machining tools.

More preferably, the second metallic powder material used is a metallic powder material compressible at a maximum pressure of 1250 MPa to an average density δ of greater than 93% of the theoretical density $δ_{th}$. At average densities δ of greater than 93% of the theoretical density $δ_{th}$, the porosity ϕ of the machining segments is below 7% by volume. The lower the porosity of the neutral zone of the machining segments, the higher the breakout resistance of the machining segments and hence the robustness of the machining tools.

BRIEF DESCRIPTION OF THE DRAWINGS

Working examples of the invention are described hereinafter with reference to the drawings. These are not necessarily intended to illustrate the working examples to scale; instead, the drawings, where conducive to elucidation, [[is]] are executed in schematic and/or slightly distorted form. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given design ranges, values within the limits mentioned shall also be disclosed as limiting values and shall be usable and claimable as desired. For the sake of simplicity, identical reference numerals are used hereinafter for identical or similar parts or parts having identical or similar function.

The figures show.

DETAILED DESCRIPTION

Figure 1A:
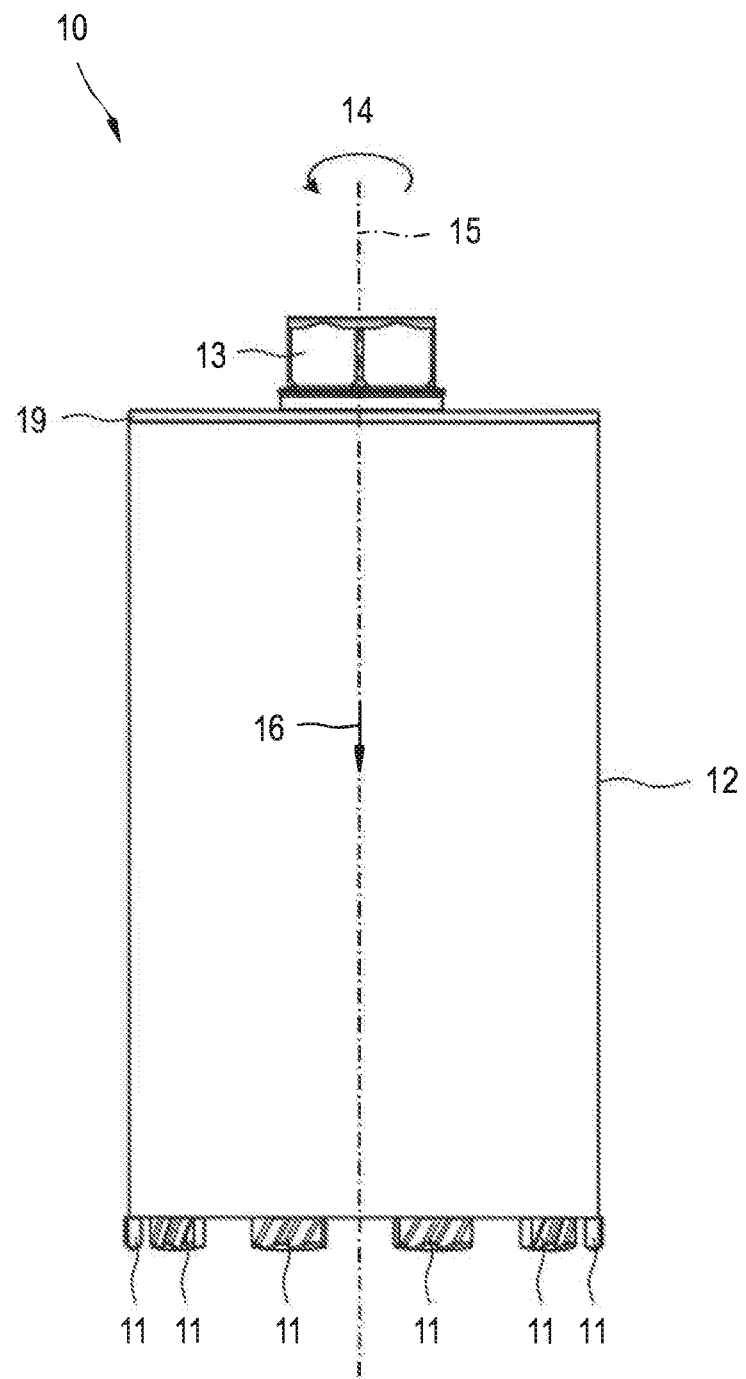
FIGS. 1A, B a first embodiment, in the form of a drill bit, of an abrasive machining tool (FIG. 1A) and a second embodiment, in the form of a saw blade, of an abrasive machining tool (FIG. 1B)

FIGS. 1A, B show a first and second embodiment of an abrasive machining tool. FIG. 1A shows the first embodiment of an abrasive machining tool in the form of a drill bit 10, and FIG. 1B the second embodiment of an abrasive machining tool in the form of a saw blade 20.

The drill bit 10 comprises multiple machining segments 11, a tubular main body 12 and a tool fitting 13. The machining segments 11 for the drill bit 10 are also referred to as drill segments 11, and the tubular main body 12 is also referred to as drill shaft. The drill bit 10 is connected to a core drill via the drill fitting 13 and, in drilling operation, is driven by the core drill in a direction of rotation 14 about an axis of rotation 15. During the rotation of the drill bit 10 about the axis of rotation 15, the drill bit 10 is moved in a feed direction 16 into a workpiece to be machined, with the feed direction 16 running parallel to the axis of rotation 15. The drill bit 10 generates a drill core and a drill hole in the workpiece to be machined.

In the working example of FIG. 1A, the drill shaft 12 is in one-piece form and the drill segments 11 are connected to the drill shaft 12 in a fixed manner. Alternatively, the drill shaft may be in two-piece form, composed of a first drill shaft section and a second drill shaft section, where the drill segments 11 are connected to the first drill shaft section in a fixed manner and the tool fitting 13 is connected to the second drill shaft section in a fixed manner. The first and second drill shaft section are connected to one another via a releasable connection device. The releasable connection device takes the form, for example, of a plug-and-twist connection as described in EP 2 745 965 A1 or EP 2 745 966 A1. The design of the drill shaft as a one-piece or two-piece drill shaft has no influence on the construction or composition of the drill segment 11.

The drill segments 11 are connected to the drill shaft 12 in a fixed manner, for example by screw connection, adhesive bonding, soldering or welding. In order to be able to weld the drill segments 11 to the drill shaft 12, the drill segments 11 must be produced from a material of good weldability at least in the contact region with the drill shaft 12. Since many metallic powder materials that are used for production of machining segments are materials that are difficult to weld, a two-piece construction of the machining segments composed of a machining zone and a neutral zone has become established. A metallic powder material having good welding properties is used for the neutral zone.

The saw blade 20 comprises multiple machining segments 21, a disk-shaped main body 22 and a tool fitting 23. The machining segments 21 for the saw blade 20 are also referred to as saw segments, and the disk-shaped main body 22 is also referred to as blade body. The saw blade 20 is connected to a saw via the tool fitting 23 and, in sawing operation, is driven by the saw in a direction of rotation 24 about an axis of rotation 25. During the rotation of the saw blade 20 about the axis of rotation 25, the saw blade 20 is moved in a feed direction 26, with the feed direction 26 running parallel to the longitudinal plane. The saw blade 20 generates a saw cut in the workpiece to be machined.

The saw segments 21 are connected to the blade body 22 in a fixed manner, for example by screw connection, adhesive bonding, soldering or welding. In order to be able to weld the saw segments 21 to the blade body 22, the saw segments 21 must be produced from a material of good weldability at least in the contact region with the blade body 22. Since many metallic powder materials that are used for production of machining segments are materials that are difficult to weld, a two-piece construction of the machining segments composed of a machining zone and a neutral zone has become established. A metallic powder material having good welding properties is used for the neutral zone.

The drill segments 11 of the drill bit 10 and the saw segments 21 of the saw blade 20 are produced by means of the method of the invention for producing a machining segment. The term "machining segments" encompasses all machining segments for abrasive machining tools. Examples of abrasive machining tools are drill bits, saw blades and grinding disks. Depending on the abrasive machining tool, machining segments for drill bits are referred to as drill segments, machining segments for saw blades as saw segments, and machining segments for grinding disks as grinding segments. All machining segments for abrasive machining tools can be produced by means of the method of the invention; the sequence of method steps is identical for all machining segments. The strength and wear rate of the machining segments is adjusted via the selection of the metallic powder material and adapted primarily to the substrate to be machined and the hard material particles used.

Figure 2A:
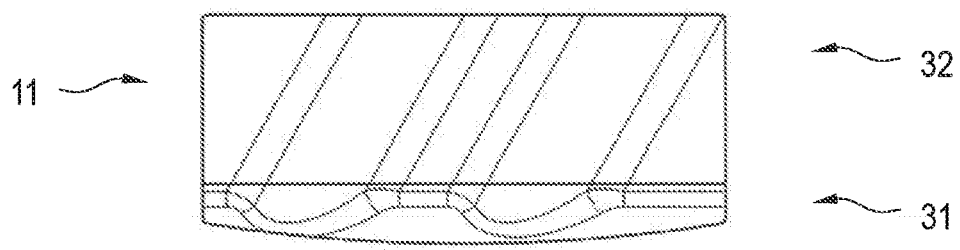
FIGS. 2A-C a machining segment of the drill bit of FIG. 1A in a view of the outside of the machining segment (FIG. 2A), in a view of the inside of the machining segment (FIG. 2B) and in a section along the section line A-A in FIG. 2B (FIG. 2C)
Figure 2B:
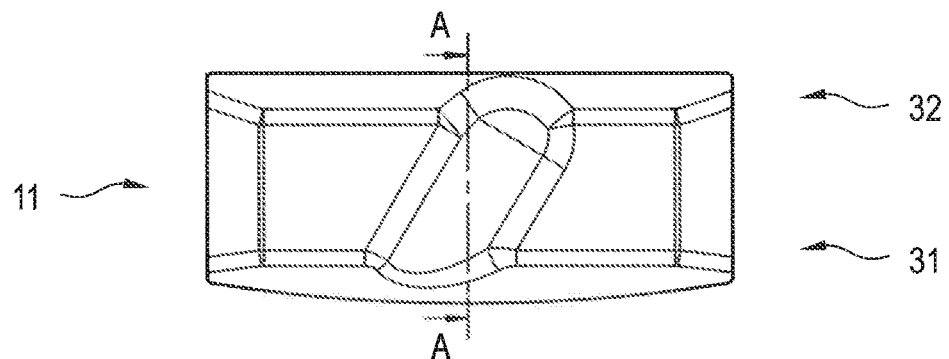
Figure 2C:
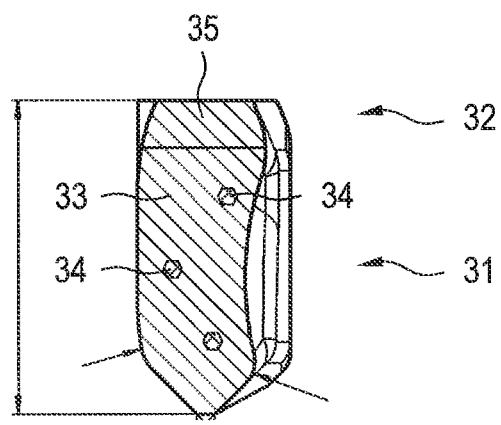

FIGS. 2A-C show the drill segment 11 of the drill bit 10 of FIG. 1A in a view of the outside of the drill segment 11 (FIG. 2A), in a view of the inside of the drill segment 11 (FIG. 2B) and in a section along the section line A-A in FIG. 2B (FIG. 2C). In the machining of a workpiece with the drill bit 10, the outside of the drill segment 11 faces the drill hole and the inside of the drill segment 11 faces the drill core. The drill segment 11 of the drill bit 10 forms a first embodiment of a machining segment which is produced by means of the method of the invention for producing a machining segment.

Since the drill segment 11 is welded to the drill shaft 12, the drill segment 11 is constructed from a machining zone 31 and a neutral zone 32 that are cohesively bonded by sintering. In the case of drill segments that are connected to the drill shaft 12 by soldering, for example, the neutral zone 32 can be dispensed with. The machining zone 31 has been produced from a first metallic powder material 33 and hard material particles 34, and the neutral zone 32 has been produced from a second metallic powder material 35, where the neutral zone 32 is free of hard material particles 35.

The first metallic powder material 33 is selected especially with regard to the properties of the drill segment 11, such as strength, wear resistance and capacity to hold the hard material particles, and the second metallic powder material 35 is selected especially with regard to good weldability to the drill shaft 12. Since there are no known metallic powder materials that achieve the desired properties of the drill segment 11 and simultaneously have good weldability, the first metallic powder material 33 and the second metallic powder material 35 in the composition are different than one another.

Figure 1B:
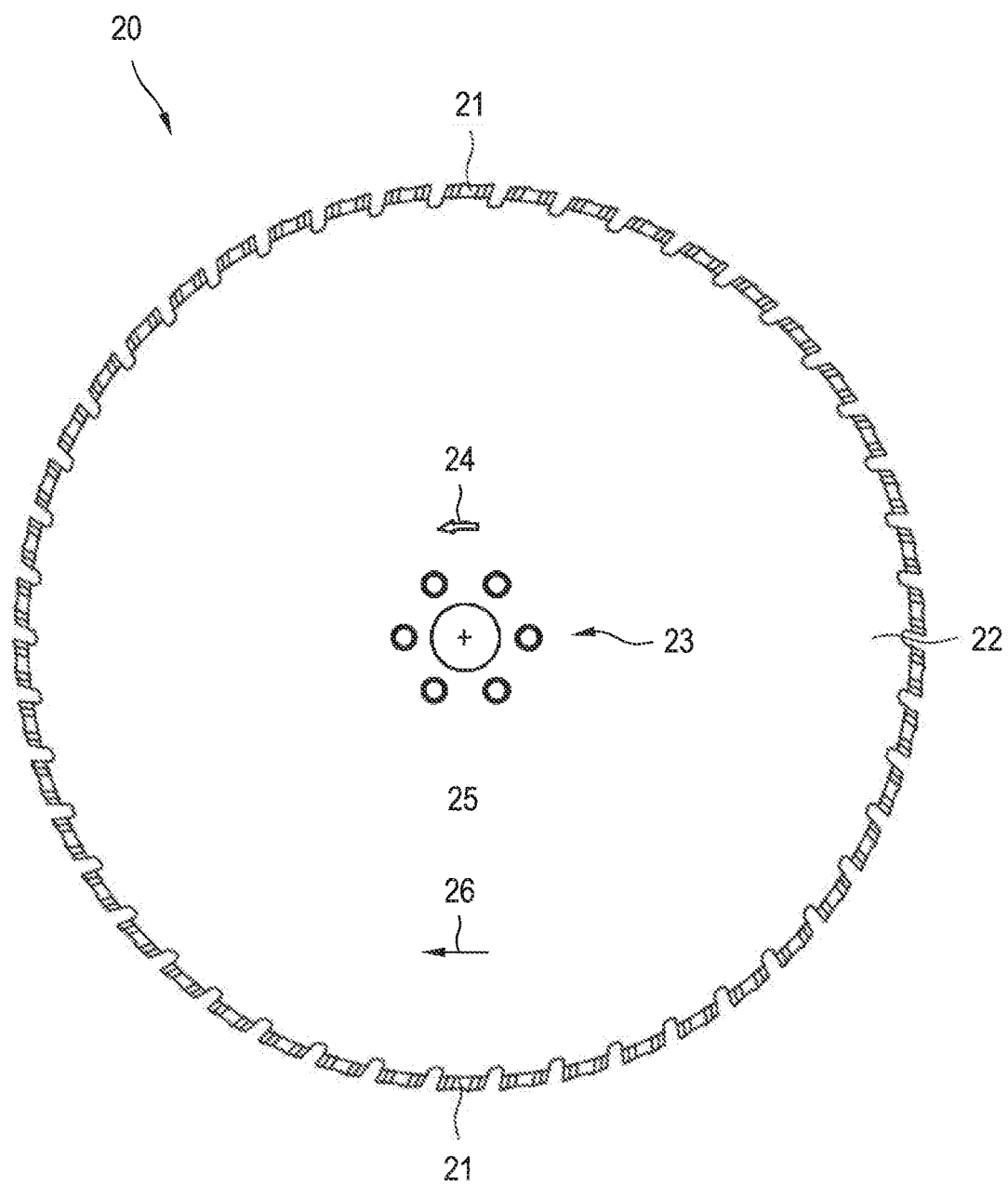
Figure 3A:
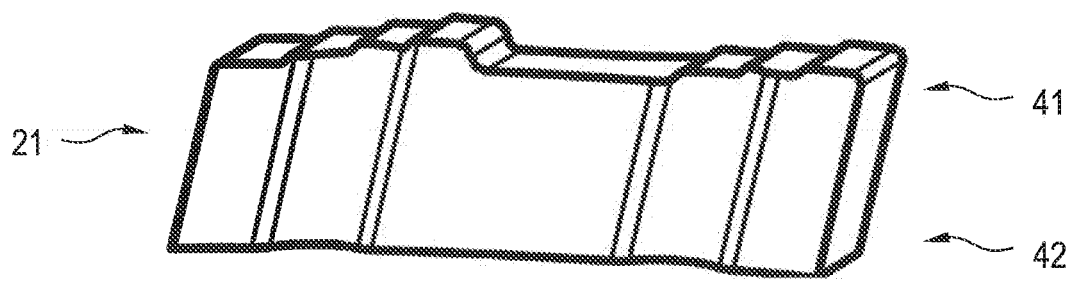
FIGS. 3A-C a machining segment of the saw blade of FIG. 1B in a three-dimensional view of the machining segment (FIG. 3A), in a view of a first side of the machining segment (FIG. 3B) and in a view of a second side of the machining segment (FIG. 3C)
Figure 3B:
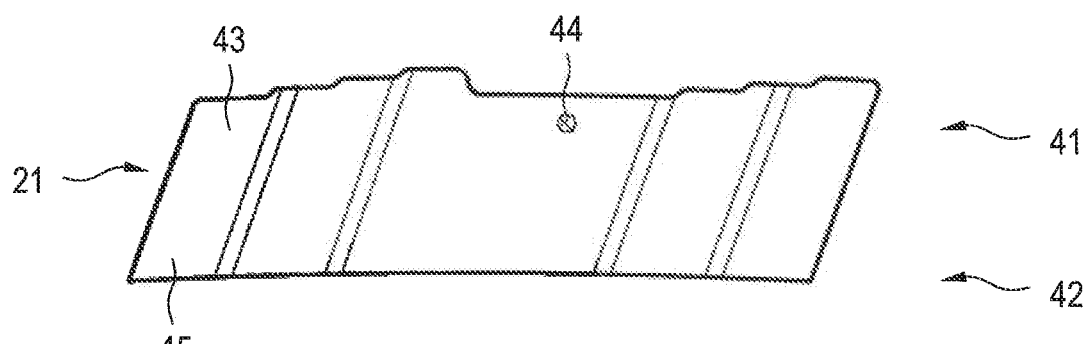
Figure 3C:
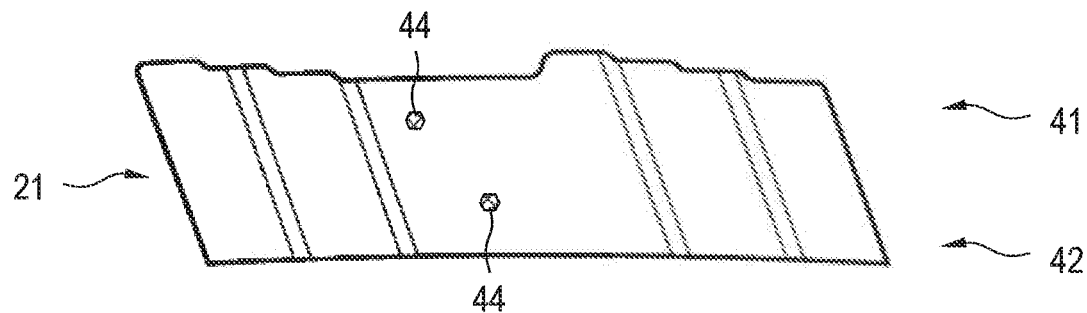

FIGS. 3A-C show the saw segment 21 of the saw blade 20 of FIG. 1B in a three-dimensional view of the saw segment 21 (FIG. 3A), in a view of a first side of the saw segment 21 (FIG. 3B) and in a view of a second side of the saw segment 21 (FIG. 3C). The saw segment 21 of the saw blade 20 forms a second embodiment of a machining segment which is produced by means of the method of the invention for producing a machining segment.

Since the saw segment 21 is welded to the main body 22, the saw segment 21 is constructed from a machining zone 41 and a neutral zone 42 that are cohesively bonded by sintering. In the case of saw segments that are connected to the main body 22 by soldering, for example, the neutral zone 42 can be dispensed with. The machining zone 41 has been produced from a first metallic powder material 43 and hard material particles 44, and the neutral zone 42 has been produced from a second metallic powder material 45, where the neutral zone 42 is free of hard material particles 44.

The first metallic powder material 43 is selected especially with regard to the properties of the saw segment 21, such as strength, wear resistance and capacity to hold the hard material particles, and the second metallic powder material 45 is selected especially with regard to good weldability to the main body 22. Since there are no known metallic powder materials that achieve the desired properties of the saw segment 21 and simultaneously have good weldability, the first metallic powder material 43 and the second metallic powder material 45 in the composition are different than one another.

Figure 4A:
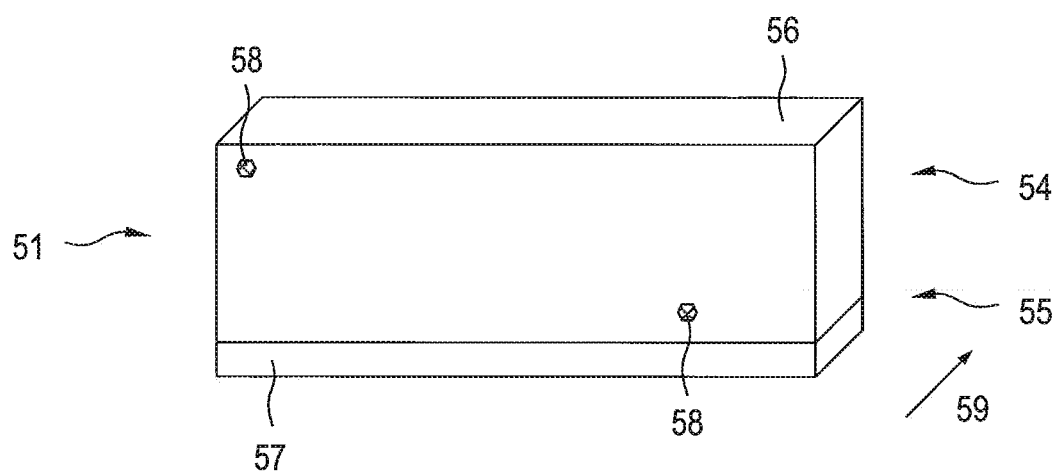
FIGS. 4A-C a machining segment as a green body (FIG. 4A), as a compact (FIG. 4B) and as a finished machining segment (FIG. 4C)
Figure 4B:
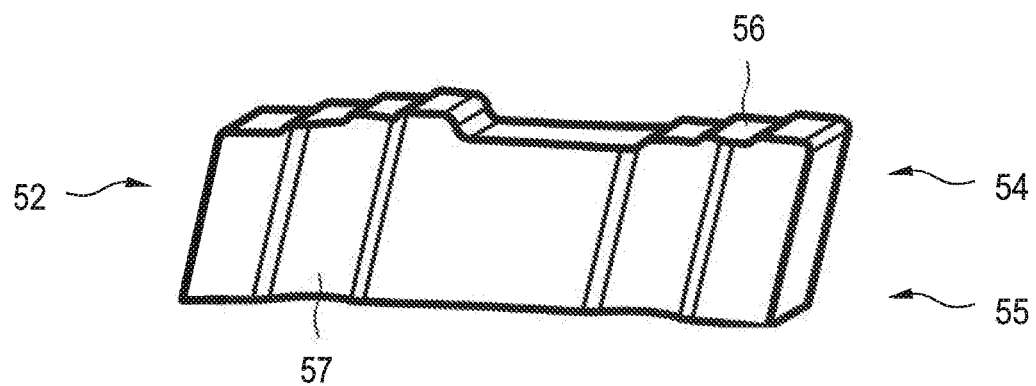
Figure 4C:
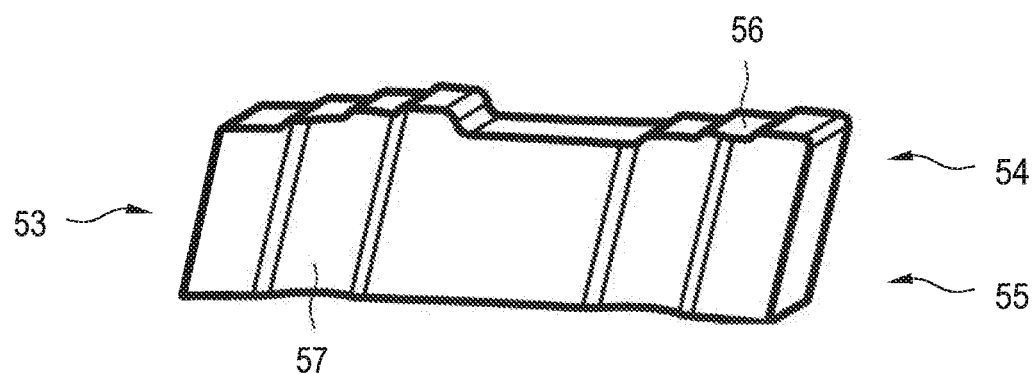

FIGS. 4A-C show a machining segment which is produced by means of the method of the invention for producing a machining segment. The machining segment is produced in a three-part method. FIG. 4A shows a green body 51 after a first part of the three-part method, FIG. 4B a compact body 52 after a second part of the three-part method, and FIG. 4C a finished machining segment 53 after a third part of the three-part method. The machining segment 53 may constitute the drill segment 11 for the drill bit 10 of FIG. 1A, the saw segment 21 for the saw blade 20 of FIG. 1B, or any machining segment for an abrasive machining tool.

The machining segment 53 is connected to a tubular or disk-shaped main body. In order to be able to weld the machining segment 53 to the main body, the machining segment 53 must be produced from a material having good weldability at least in the contact region with the main body. Since many metallic powder materials that are used for production of machining segments are materials that are difficult to weld, the machining segment 53 is in a two-part construction composed of a machining zone 54 and a neutral zone 55, with the machining zone 54 and neutral zone 55 cohesively bonded to one another by sintering.

In the first part of the three-part method, the machining zone 54 and neutral zone 55 of the green body 51 are constructed layer by layer from material layers of a first and second metallic powder material 56, 57 and particle layers of hard material particles 58, where the material layers and particles layers are stacked in a construction direction 59. In the second part of the three-part method, the green body 51 constructed layer by layer is compacted under pressure with a compression force to result in the compact body 52 and shaped to the final geometry of the machining segment 53. In the third part of the three-part method, the compact body 52 is sintered thermally at a sintering temperature $T_{sinter}$ to result in the finished machining segment 53. The machining segment 53 is shaped to the final geometry at a compression pressure of 1200 MPa and sintered at a sintering temperature $T_{sinter}$ of 975° C. for 30 minutes.

The first metallic powder material 56 consists, for example, of 91.5% by mass of iron powder, 5% by mass of bronze (copper-tin), 3% by mass of bismuth sulfide and 0.5% by mass of carbon; in addition, a compression auxiliary is used. The second metallic powder material 57 consists, for example, of 99.8% by mass of iron powder and 0.2% by mass of carbon; in addition, a compression auxiliary is used. An example of a suitable iron powder for the first and second metallic powder material 56, 57 is Astaloy Mo from Höganäs, a pre-alloyed iron powder with 1.5% by mass of molybdenum. The first metallic powder material 56 and the second metallic powder material 57 have the advantage that they contain at least 80% by mass of an iron powder, which is available inexpensively, and enable the inexpensive production of machining segments in the method of the invention.

The properties of the first metallic powder material 56 are chosen such that the green body 51 is compressible at a pressure between 850 MPa and 1250 MPa to an average density $\delta$ of at least 90% of the theoretical density $\delta_{th}$ of the first metallic powder material 56. At an average density $\delta$ of at least 90% of the theoretical density $\delta_{th}$, the porosity of the machining segment 53 is below 10% by volume. The first metallic powder material 56 used is a metallic powder material which is free-flowing, has a maximum grain size of 200 μm and is compressible at a maximum pressure of 1250 MPa to an average density $\delta$ of greater than 90% of the theoretical density $\delta_{th}$. A first metallic powder material 56 having the properties mentioned (flowability, maximum grain size and compatibility) enables the production of machining segments that meet the demands with regard to the strength of the finished machining segment 53 and the wear rate of the sintered first metallic powder material 56. The layer-by-layer construction of the green body 51 from material layers requires an at least readily flowing first metallic powder material 56. The use of powder materials having a maximum grain size of 200 μm ensures that the hard material particles can be placed with sufficient accuracy into the material layer applied beforehand. A first metallic powder material compressible at a maximum pressure of 1250 MPa to an average density $\delta$ of at least 90% of the theoretical density $\delta_{th}$ is suitable the production of machining segments having a porosity of less than 10% by volume.

The properties of the second metallic powder material 57 are selected with regard to weldability. The second metallic powder material 57 used is a metallic powder material which is at least readily flowing and is compressible at a maximum pressure of 1250 MPa to an average density $\delta$ of greater than 90% of the theoretical density $\delta_{th}$. More preferably, the second metallic powder material 57 used is a metallic powder material which is free-flowing. An at least readily flowing second metallic powder material 57 is suitable for the layer-by-layer construction of the neutral zone 55 within the method of the invention. The higher the flowability of the second metallic powder material 57, the better the suitability of the second metallic powder material 57 for the layer-by-layer construction of the neutral zone 55. At average densities $\delta$ of greater than 90% of the theoretical density $\delta_{th}$, the porosity $\phi$ of the neutral zone 55 of the machining segments 53 is below 10% by volume.

Figure 5:
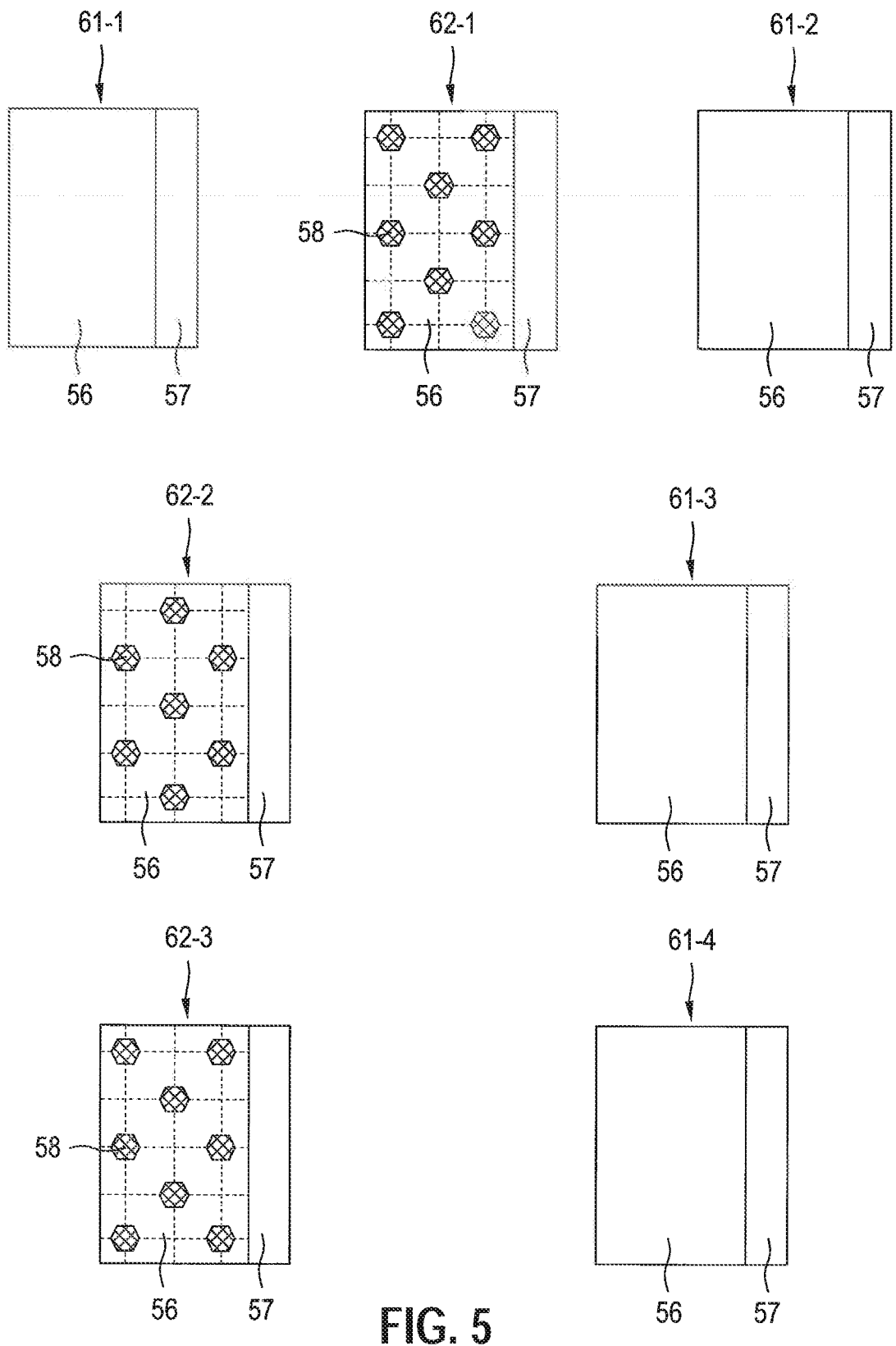
FIG. 5 the material layers and particles layers from which the green body of FIG. 4A is produced layer by layer.

FIG. 5 shows the material layers of the first and second metallic powder material 56, 57 and the particle layers of the hard material particles 58, from which the green body 51 (see FIG. 4A) is produced layer by layer. The green body 51 is constructed in construction direction 59 from N=4 material layers of the first and second metallic powder material 56, 57 and M=3 particle layers of the hard material particles 58.

A first material layer 61-1 having a first layer thickness $d_1$ in construction direction 59 forms the underside of the green body 51 and is also referred to as lower outer layer. A first particle layer 62-1 of the hard material particles 58 is arranged on the first material layer 61-1 of the first and second metallic powder material 56, 57. A second material layer 61-2 having a second layer thickness $d_2$ in construction direction 59 is applied to the first particle layer 62-1. A second particle layer 62-2 of the hard material particles 58 is arranged on the second material layer 61-2 of the first and second metallic powder material 56, 57. A third material layer 61-3 having a third layer thickness $d_3$ in construction direction 59 is applied to the second particle layer 62-2. A third particle layer 62-3 of the hard material particles 58 is arranged on the third material layer 61-3 of the first and second metallic powder material 56, 57. A fourth material layer 61-4 having a fourth layer thickness $d_4$ in construction direction 59 forms the topside of the green body 51 and is also referred to as upper outer layer.

The hard material particles 58 of the first, second and third particle layers 62-1, 62-2, 62-3 are arranged within the green body 51, and the surface of the green body 51 does not have any protruding hard material particles 58. On compaction of the green body 51 under pressure in the second part of the three-part method, there is no occurrence of wear on the mold as a result of protruding hard material particles 58, and so it is possible to use a pressure greater than 850 MPa that compacts the green body 51 to the final geometry. A high compression pressure enables inexpensive and mold-conserving production of machining segments having an average density exceeding 90% of the theoretical density and a porosity below 10% by volume.

The hard material particles 58 of the first particle layer 62-1, the second particle layer 62-2 and the third particle layer 62-3 are arranged in set patterns. In the working example, the set pattern of the first particle layer 62-1 corresponds to the set pattern of the third particle layer 62-3, and the set pattern of the second particle layer 62-2 is shifted in a plane at right angles to the construction direction 59 with respect to the set patterns of the first and third particle layers 62-1, 62-3. With the aid of longitudinal and transverse lines, a two-dimensional grid is generated, at the points of intersection of which the hard material particles 58 are disposed. The points of intersection are populated according to a predefined rule; for example, every second point of intersection of the grid is populated with a hard material particle 58. In the grid of FIG. 5, the longitudinal and transverse lines run straight and are arranged at right angles to one another. Alternatively, for example, it is possible to use circular segments as longitudinal lines that are arranged parallel or concentric to one another, and/or the transverse lines may be inclined at an angle relative to the longitudinal lines.

What is claimed is:

1. A method of producing a finished machining segment, the method comprising:
   constructing a green body for a machining zone produced from a first metallic powder material and hard material particles;
   compacting the green body under pressure with a compression pressure to result in a compact body with a machining segment with the machining zone, with the compact body having a final geometry of the machining segment; and
   thermally sintering the compact body at a sintering temperature to result in the finished machining segment,
   the machining zone being produced by layer-by-layer application of material layers of the first metallic powder material and particle layers of the hard material particles along a construction direction, each material layer defining a plane perpendicular to the construction direction, where each of the hard material particles of each of the particle layers are placed according to a defined set pattern into a previously applied material layer of the material layers so as to be spaced in a defined arrangement in the plane, wherein the particle layers include a first particle layer and a second particle layer, the first and second particle layers having different set patterns.

2. The method as recited in claim 1 wherein a number of the material layers is N, and a number of the particle layers is M, N being not less than M.

3. The method as recited in claim 2 wherein the hard material particles of the one particle layer are placed into the previously applied material layer with a lateral distance of greater than 50 μm, the lateral distance being a distance of the placed hard material particles to the outer surface of the previously applied material layer in a plane perpendicular to the construction direction.

4. The method as recited in claim 2 wherein the placing of an Mth particle layer of the particle layers is followed by application of a further material layer of the material layers to define an upper outer layer.

5. The method as recited in recited in claim 1 wherein the compression pressure is between 850 MPa and 1250 MPa.

6. The method as recited in claim 1 wherein the sintering temperature is between 900° C. and 1050° C.

7. The method as recited in claim 1 wherein the first metallic powder material is a readily-flowing metallic powder material.

8. The method as recited in claim 1 wherein the first metallic powder material is a free-flowing metallic powder material.

9. The method as recited in claim 1 wherein the first metallic powder material has a maximum grain size of 200 μm.

10. The method as recited in claim 1 wherein the first metallic powder is compressible at a maximum pressure of 1250 MPa to an average density of greater than 90% of a theoretical density.

11. The method as recited in claim 1 wherein first metallic powder material is compressible at a maximum pressure of 1250 MPa to an average density of greater than 93% of a theoretical density.

12. The method as recited in claim 1 wherein the first metallic powder material is free-flowing, has a maximum grain size of 200 μm and is compressible at a maximum pressure of 1250 MPa to an average density of greater than 90% of a theoretical density.

13. The method as recited in claim 1 wherein the first metallic powder material contains at least 80% by mass of an elemental or low-alloy iron powder.

14. The method as recited in claim 13 wherein the metallic powder material contains not more than 10% by mass of a metal sulfide.

15. The method as recited in claim 14 wherein the metal sulfide has a melting temperature below the sintering temperature.

16. The method as recited in claim 1 wherein the green body is constructed from the machining zone and a neutral zone, where the neutral zone is produced from a second metallic powder material and the second metallic powder material is different than the first metallic powder material.

17. The method as recited in claim 16 wherein the second metallic powder material is a readily-flowing metallic powder material.

18. The method as recited in claim 16 wherein the second metallic powder material is a free-flowing metallic powder material.

19. The method as recited in claim 16 wherein the second metallic powder material is compressible at a maximum pressure of 1250 MPa to an average density of greater than 90% of a theoretical density.

20. The method as recited in claim 16 wherein the second metallic powder material is compressible at a maximum pressure of 1250 MPa to an average density of greater than 93% of a theoretical density.

21. The method as recited in claim 1 wherein the hard particles are arranged exclusively within the green body.

22. The method as recited in claim 1 wherein the different set pattern of the second layer is created by shifting in the plane a first pattern of the first particle layer.

* * * * *